July 7, 1942. L. H. DE WYK 2,288,612
WORK CONVEYING APPARATUS
Original Filed Nov. 20, 1936 5 Sheets-Sheet 2
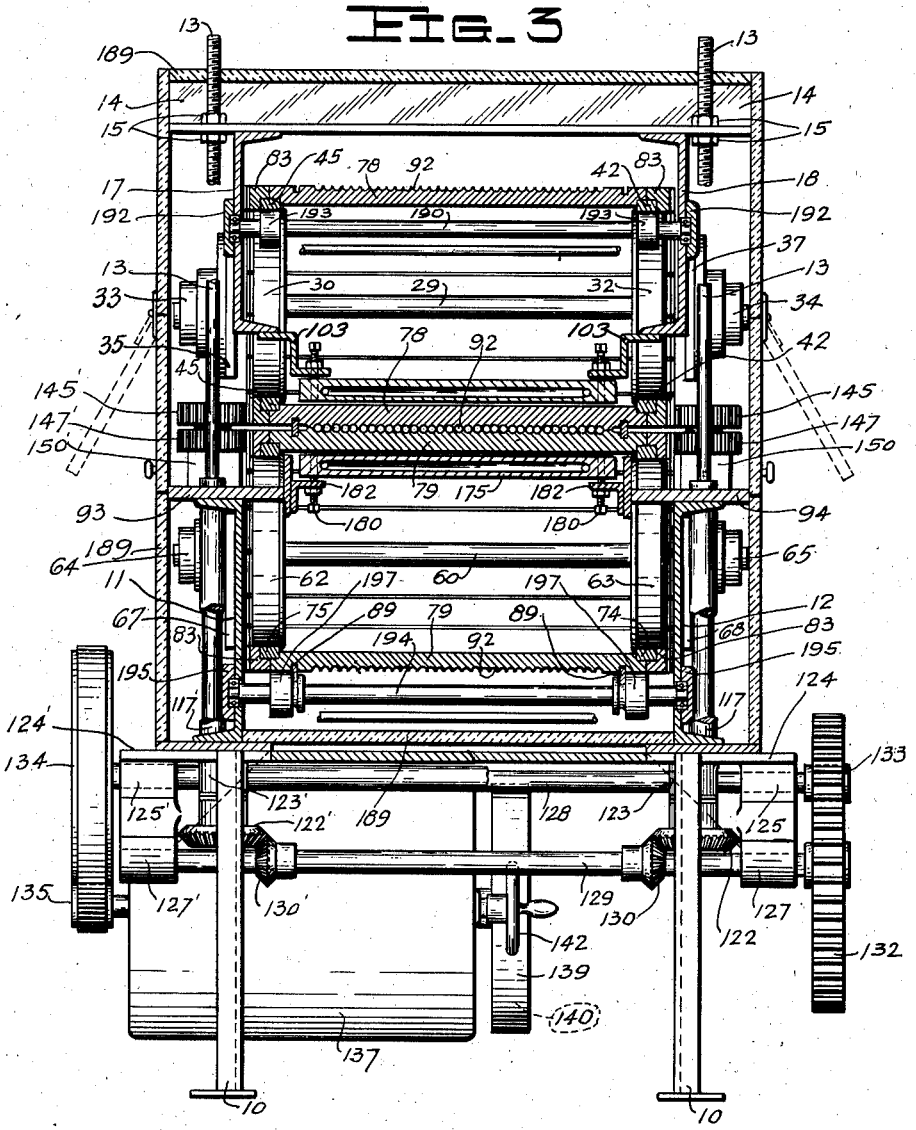
Fig. 3
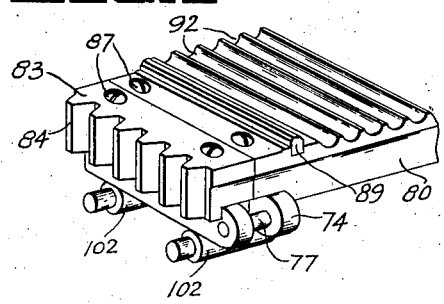
Fig. 2
INVENTOR
Rudolf H. DeWyk,
BY
ATTORNEY

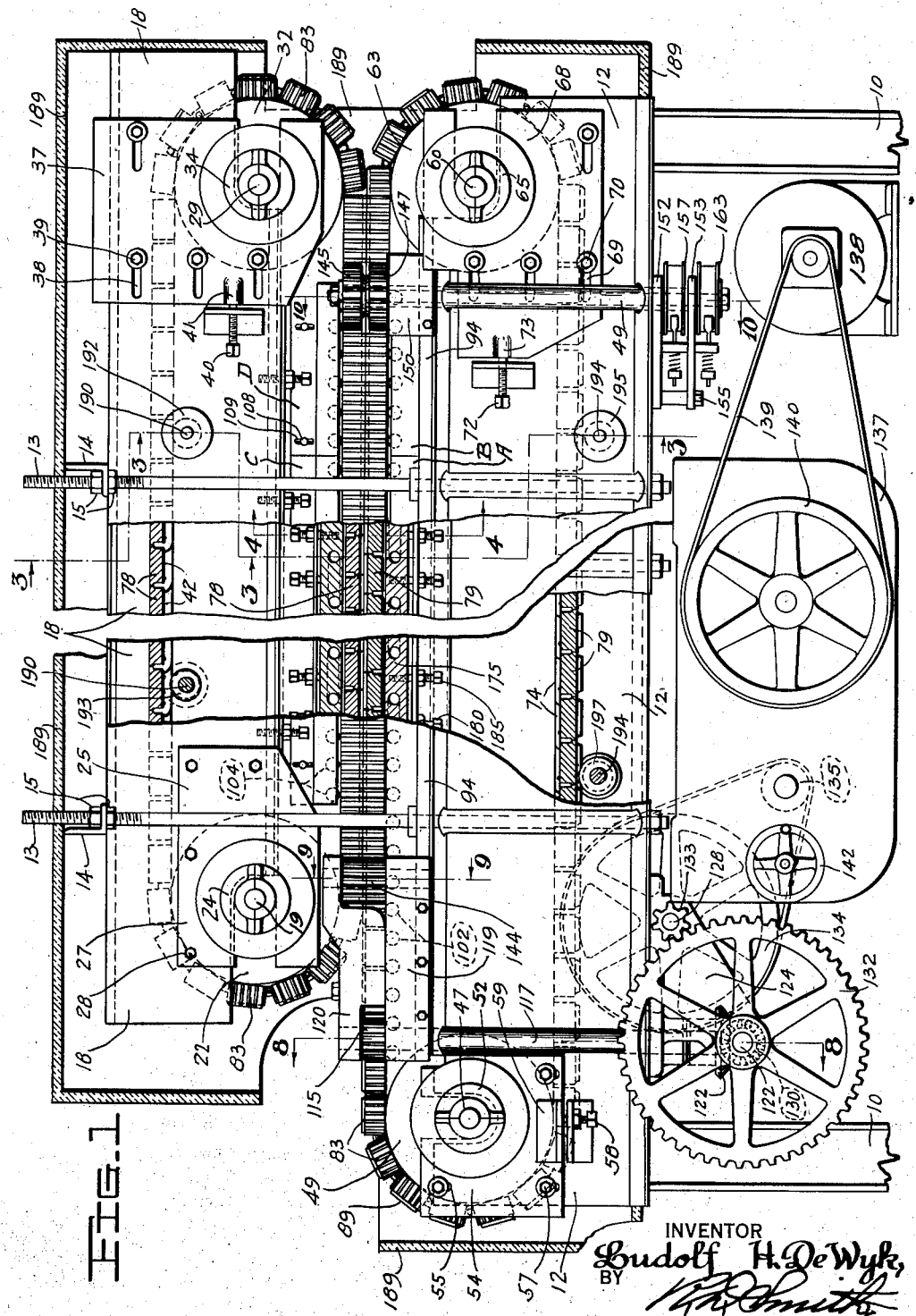

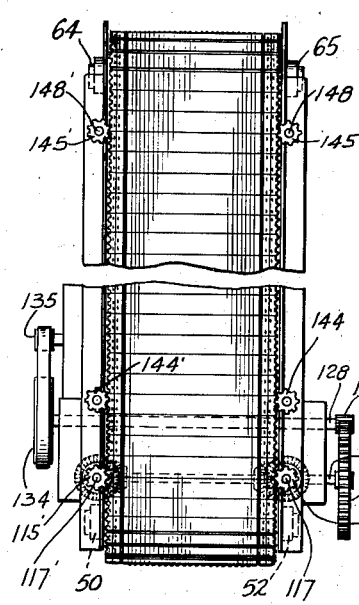
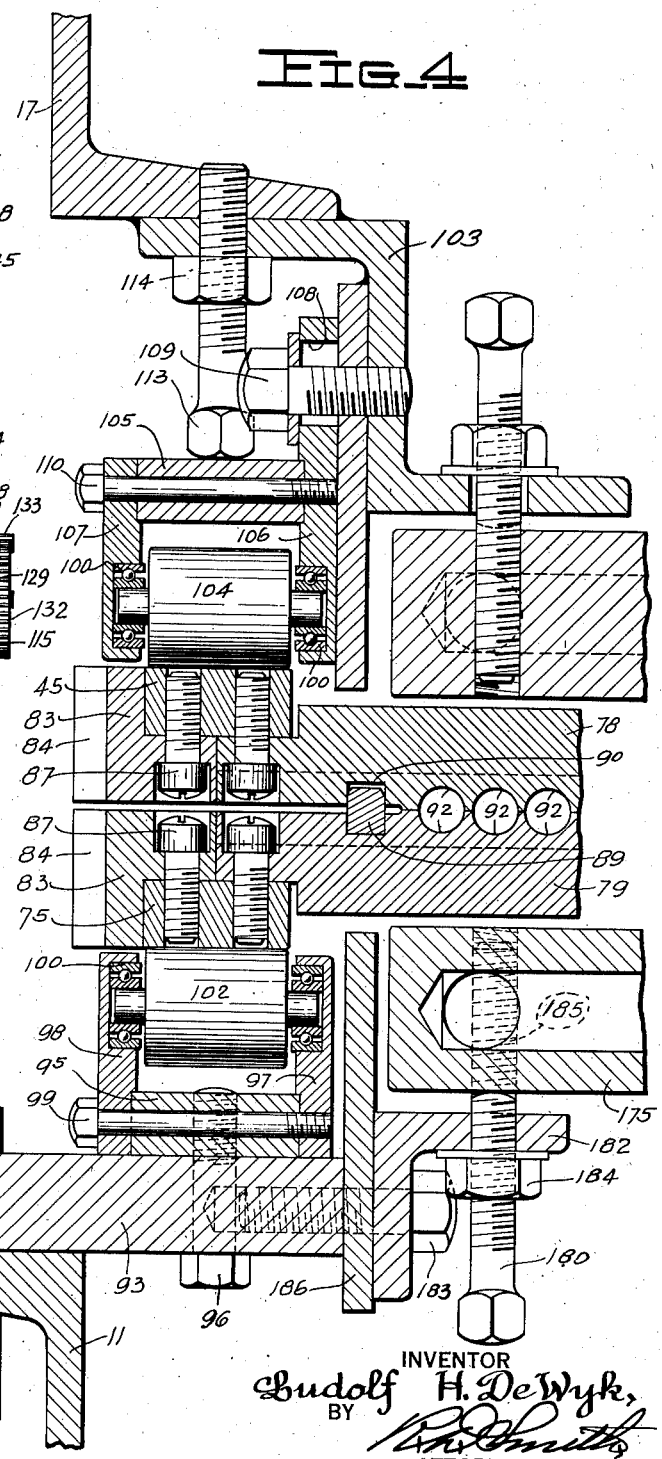

July 7, 1942.  L. H. DE WYK  2,288,612
WORK CONVEYING APPARATUS
Original Filed Nov. 20, 1936   5 Sheets-Sheet 4
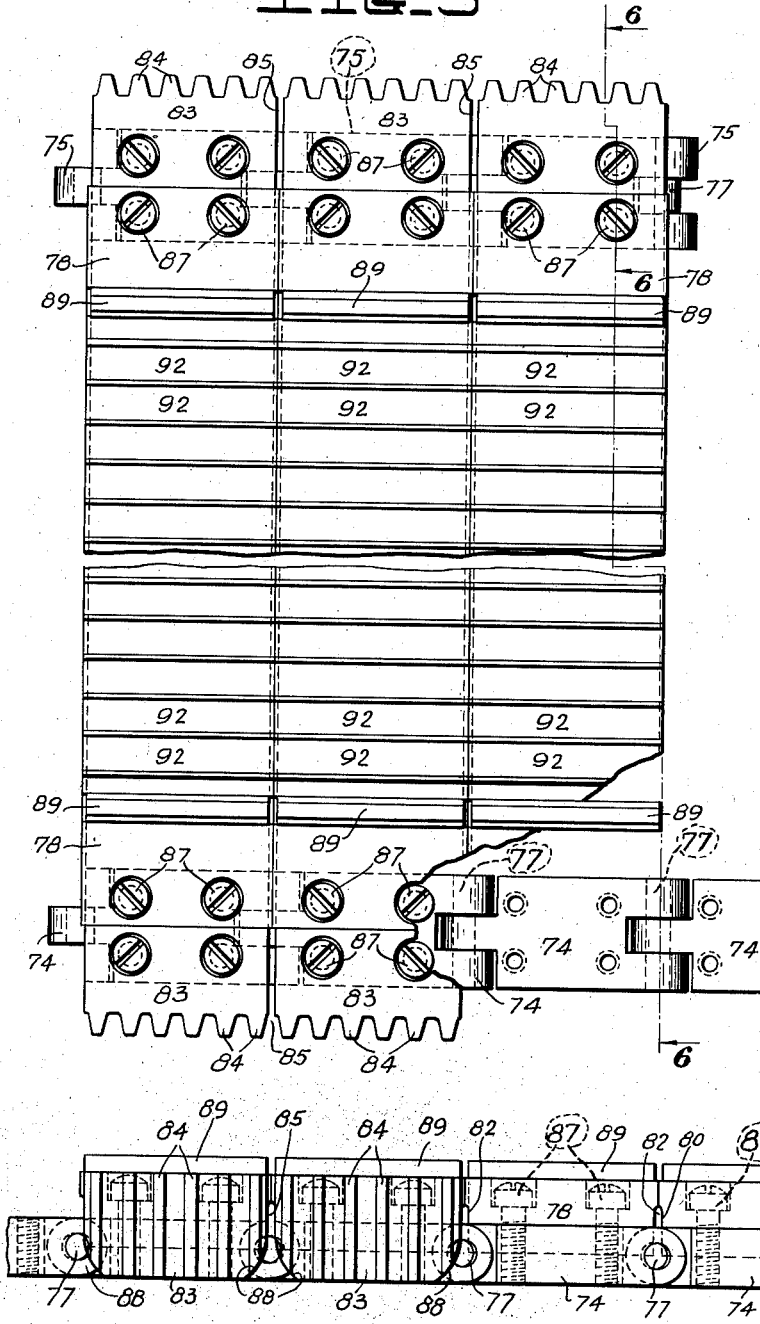
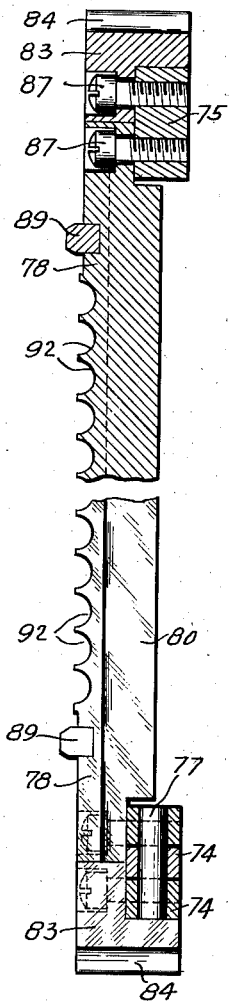
INVENTOR
Ludolf H. De Wyk,
BY
ATTORNEY July 7, 1942.   L. H. DE WYK   2,288,612
WORK CONVEYING APPARATUS
Original Filed Nov. 20, 1936   5 Sheets-Sheet 5
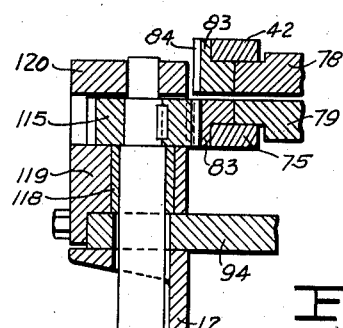
Fig. 8
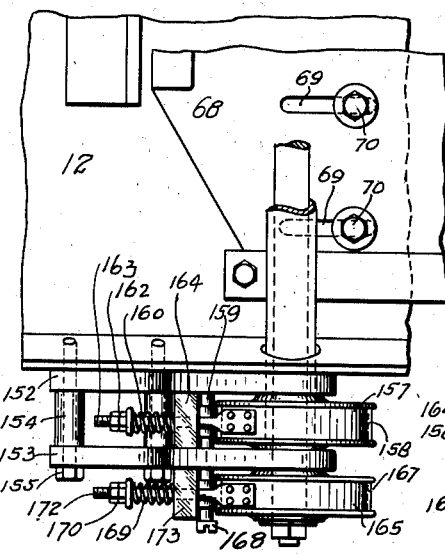
Fig. 9
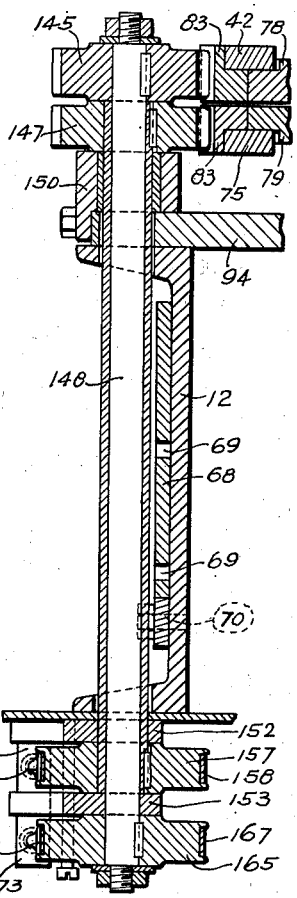
Fig. 10
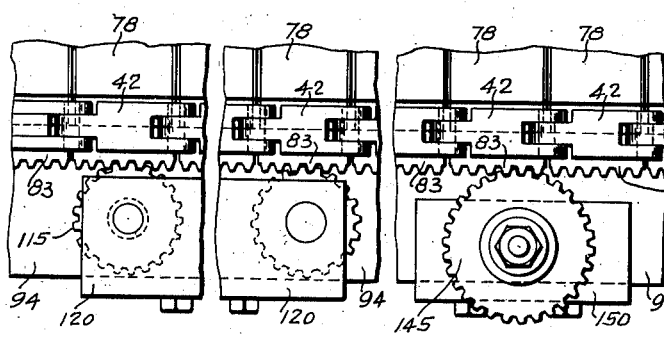
Fig. 11
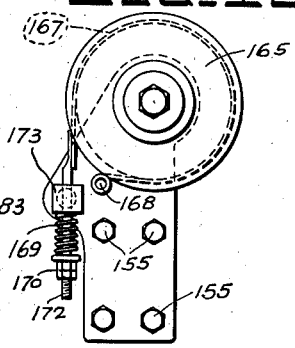
Fig. 12
Fig. 13
INVENTOR
Ludolf H. De Wyk,
BY
ATTORNEY Patented July 7, 1942

2,288,612

UNITED STATES PATENT OFFICE 2,288,612

WORK CONVEYING APPARATUS

Ludolf H. De Wyk, Ansonia, Conn., assignor to The Sponge Rubber Products Company, Shelton, Conn., a corporation of Connecticut Original application November 20, 1936, Serial No. 111,769. Divided and this application July 9, 1941, Serial No. 401,629

8 Claims. (Cl. 198—162)

This invention relates to apparatus which incorporates a traveling articulated train of interconnected self rigid carriers for holding and conveying work, and particularly for conveying material of slowly flowable or plastic nature in a manner to prevent escape of such work material from its designed supporting surfaces on the traveling carriers.

In particular the present improvements are useful for conveying work material of this nature, as for instance, sponge rubber compound, into and through a molding and vulcanizing machine such as that which is the subject of my copending application, Serial No. 111,769, filed November 20, 1936, from which the present application is divisional.

One object of the improvements herein claimed is to provide means to support, impel and corelate such carriers so that they may move in endless procession while any desired number of adjacent carriers in a predetermined stretch of the train are dependably forced into tightly abutting mutual engagement despite any looseness which may develop between the associated parts of the train or its impelling mechanism from wear, or which is necessary to the freedom required for certain mechanical performance of the train.

Another object is to provide an endless train of such carriers fixedly interconnected to form a chain that passes around spaced supporting wheels.

Another object is to provide a driving mechanism adapted to furnish impelling power directly to the carriers of the train without utilizing the pivotal joints between interconnected chain links for transmitting such power to other carriers of the train.

Another object is positively to impel the carriers of the train by constantly pushing ahead upon successive carriers as they pass a driving mechanism.

A further object is to provide a retarding mechanism which shall so cooperate with the driving mechanism of the traveling train of carriers that the force with which adjacent carriers of such train shall be shoved into abutting contact with each other while the machine is running may selectively be determined by a means of adjustment that may be availed of either while the machine is idle or while the machine is running.

A further object is to eliminate as fully as possible all frictional resistance tending to oppose travel of the carriers between the before mentioned driving mechanism and retarding mechanism thereby to reduce such resistance to materially smaller proportions than would result from straight surface to surface sliding support and constraint of the carriers in this portion of their travel.

A further object is to provide an anti-friction track adapted to support the weight of individual carriers as they travel and composed of a series of freely turnable rollers, which track is sectional and supported upon the frame of the machine in such manner that different sections of its length are separately removable from the machine frame, the rollers preferably being so spaced that two of them always contribute to the support of a single carrier.

A further object is to provide a downward acting means of thrust opposing constraint for all of the traveling carriers between the before mentioned driving mechanism and retarding mechanism to prevent upward buckling of the train in this portion of its length, such thrust opposing means preferably taking the form of an overhead track-like series of anti friction rollers supported by the frame of the machine in regulatable relation to the roller supported carriers passing therebeneath.

A further object is to provide bearings for at least one chain carrying wheel shaft which shall be adjustable in relation to the frame and in relation to the other chain carrying wheel shaft in a manner to regulate the tightness or looseness of its carried chain.

A particular object of the present improvements is to provide for the supporting and impelling of interchangeable kinds of carriers so that carriers of a given train may be replaced by other carriers, and which may contain work holding cavities of different shapes and sizes, each carrier for this purpose being separately and interchangeably mountable upon and removable from any one of the associated links of the chain quickly and conveniently.

A further object is separately and removably to mount upon a common chain link with each carrier, and in rigid relation to such link and carrier, a block provided with gear teeth so spaced and arranged that a succession of such blocks may form a traveling rack meshable with frame carried power gears and retarding gears.

A further object is to provide only whole teeth upon each of such toothed blocks for meshing engagement with the teeth of power and retarding gears.

A further object is to make use of key-like projections for laterally guiding the carriers during their idling travel in their return journey along the bottom stretch of the chain between the spaced chain supporting wheels so that the work supporting face of the carriers may be protected as fully as possible in this return travel against lengthwise rubbing and wear.

A further object is to support one or more heat delivering units, as for instance steam plates, in a manner to be adjustable upon the frame so that the nearness of such unit or units to the traveling carriers can be adjusted finely at will.

A further object is to mount the before mentioned anti-friction roller track and heat delivering unit in separately adjustable relation upon a common frame so that a plurality of such tracks and plates may individually be adjusted in relation to the traveling carriers of a train deriving its support from a common frame.

The foregoing and other objects will become clear from the following description of apparatus which embodies illustrative forms of these improvements, and which will now be described with reference to the accompanying drawings, wherein:

Fig. 1 is a view in side elevation showing a vulcanizing machine which incorporates conveying apparatus embodying the present invention, a portion of such machine and apparatus being shown in longitudinal vertical section.

Fig. 2 is a fragmentary perspective view showing the support of one carrier jointly by two track rollers.

Fig. 3 is a view of the machine in end elevation looking from the left at Fig. 1 and showing upper portions of the machine vertically sectioned on the several planes 3—3—3—3 in Fig. 1.

Fig. 4 is a fragmentary view taken in section on the vertical plane 4—4 in Fig. 1 and is drawn on a greatly enlarged scale.

Fig. 5 is a plan view of three of the carriers and five of the toothed blocks in the top span of the lower chain of Fig. 1 drawn on a scale somewhat smaller than in Fig. 4, the break indicating arbitrary proportion of carrier width to carrier length with one end of one carrier broken away better to expose the underlying chain links.

Fig. 6 is a view taken in section on the planes 6—6—6 in Fig. 5 looking in the direction of the arrows.

Fig. 7 is an edgewise view of four of the carriers of Fig. 5, and further shows chain links and toothed blocks in assembled relationship to certain of the carriers.

Fig. 8 is a view drawn on an enlarged scale taken in central vertical section through the driving gear shaft on the plane 8—8 in Fig. 1 looking in the direction of the arrows.

Fig. 9 is a view on a similar scale taken in central vertical section through the train-to-train transmission gear on the plane 9—9 in Fig. 1 looking in the direction of the arrows.

Fig. 10 is a view on a similar scale taken in central vertical section through the retarding gear shaft on the plane 10—10 in Fig. 1 looking in the direction of the arrows.

Fig. 11 is a side elevation of the brake mechanism for the retarding gears looking from the left at Fig. 10 showing this mechanism as viewed in Fig. 1 but drawn on the same scale as in Fig. 10.

Fig. 12 is a bottom plan view looking upwardly at Fig. 10.

Fig. 13 is a plan view looking downward upon the combined mechanisms of Figs. 8, 9, and 10 as these mechanisms are cooperatively assembled in Fig. 1, the breaks indicating arbitrary spacing of these mechanisms lengthwise of the machine.

Fig. 14 represents diagrammatically the location in plan view of the various carrier impelling and retarding spur gears.

Certain processes which may fully or in part be carried out by the use of the present apparatus and examples of various mechanisms which may be operatively associated therewith are described in my hereinbefore mentioned copending application and also in United States Patents Nos. 2,200,262, and 2,213,527. For the purpose described in the above said application and patents, work carriers comprising a traveling train must abut tightly as they travel toward and through a processing station, which station herein is represented as the heated zone of a vulcanizing machine.

With particular reference to Figs. 1 and 3, the lower or fixed frame portion of such vulcanizing machine may be of any desired length. It is supported at spaced points by any appropriate number of legs 10 and includes two horizontal, laterally spaced U-channel beams 11 and 12 extending parallelly throughout the length of the machine and rigidly connected together and braced by tie rods (not shown) or the like, at any suitable points in their length. Penetrating the out-turned edge flanges of each channel beam are upstanding frame posts 13 of which any suitable number may be spaced along the length of the frame. At their tops the posts 13 at opposite sides of the machine are rigidly connected and braced by cross bars or angle irons 14 whose height, as supported by each post, may be finely regulated and maintained by nuts 15 having threaded engagement with the posts.

The upper or vertically adjustable frame portion of the apparatus comprises two laterally spaced U-channel beams 17 and 18 having inturned edge flanges and depending from, and made rigid to, the angle irons 14 in any suitable way, as by welding. These beams extend parallelly throughout the length of the machine above the fixed frame portion or lower beams 11 and 12. Rigidity of the upper frame portion may be increased by tie rods (not shown) connecting and bracing the channel beams 17 and 18 at suitable points along their lengths.

A horizontal shaft 19 carrying spaced wheels similar to 30 and 32 of which one appears at 22 is journaled in similar anti-friction bearing housings of which one appears at 24, which housings are respectively supported in cut-out portions of similar bearing plates of which one appears at 27, mounted against oversized cut-out ends of channel beams 17 and 18, respectively, by bolts 28 at the work receiving or left end of the machine in Fig. 1.

A similar shaft 29 carrying spaced wheels 30 and 32 is journaled in anti-friction bearing housings 33 and 34 respectively supported in cut-out portions of bearing plates 35 and 37 which have horizontally elongated slots 38 engaged by bolts 39 to hold the bearing plates 35 and 37 in horizontally adjustable position on the oversized cut-out ends of channel beams 17 and 18 respectively at the work delivery or right end of the machine in Fig. 1.

The adjustor screw 40 carried on beam 18 bears on a projecting boss 41 of bearing plate 37 to force the latter toward the right in Fig. 1 for regulating the tightness of a chain of links 42 which passes around and is supported by wheels 22 and 32. A similar adjustor screw (not shown)

is similarly carried by the beam 17 and acts in a similar manner upon a boss on the companion plate of bearing plate 37 to force such companion plate toward the delivery end of the machine in Fig. 2 for regulating the tightness of a chain of links 45 which passes around and is supported by wheel 30 and the corresponding wheel (not shown) on shaft 19.

A similar shaft 47 carrying similar spaced wheels of which one appears at 49 is journaled in anti-friction bearing housings 50 and 52 respectively supported in cut-out portions of similar bearing plates of which one appears at 54, which plates have vertically elongated slots 55 engaged by bolts 57 to hold these bearing plates in vertically adjustable position on the oversize cut-out ends of channel beams 11 and 12 respectively at the receiving or left end of the machine in Fig. 1.

The adjustor screw 58 is carried on beam 12 and bears on a boss 59 of bearing plate 54 to raise the latter or permit it to be lowered in Fig. 1, and a similar adjustor screw (not shown) is carried by the beam 11 and acts in a similar manner upon the companion plate of bearing plate 53 to raise the latter or permit it to be lowered.

A similar shaft 60 carrying spaced wheels 62 and 63 is journaled in anti-friction bearing housings 64 and 65, respectively supported in cut-out portions of bearing plates 67 and 68, which have horizontally elongated slots 69 engaged by bolts 70 to hold bearing plates 67 and 68 in horizontally adjustable position on the oversize cut-out ends of channel beams 11 and 12 respectively at the delivery or right end of the machine in Fig. 1. The adjustor screw 72 is carried by beam 12 and bears on a projecting boss 73 on bearing plate 68 to force the latter toward the right in Fig. 1 for regulating the tightness of a chain of links 74 which passes around and is supported by wheels 49 and 63. A similar adjustor screw (not shown) is similarly carried by the beam 11 and acts in a similar manner upon the bearing plate 67 supporting bearing housing 64 to force the latter toward the delivery end of the machine in Fig. 14 for regulating the tightness of a chain of links 75 which passes around and is supported by wheel 62 and by the aforesaid other wheel on shaft 47.

In Figs. 5, 6 and 7, there is most clearly shown on an enlarged scale the construction of the chain links which is common to all of the four chains above referred to, the pivotal connection between all adjacent links including a pivot pin 77. The looseness of this pin in its bearing holes in the links is shown on an exaggerated scale in Fig. 7 to illustrate a point of the construction which is of importance in the operation of my improved machine.

Extending crosswise the machine and mounted at one end upon a link 45 or 75 and at the other end upon a link 42 or 74 are carriers 78 of a lower train and similar complementary mold sections 79 of an upper train, each of which carriers and mold sections comprises a bar-like structure whose maximum width occurs across its face which contains the carrier cavities and which width is as great or slightly greater than the minimum possible center distance between successive pins 77, 77 when the play in the pin bearings has been taken up in that direction which shortens the chain. Elsewhere in the thickness of the carrier bar this width is slightly reduced as at 80 (Figs. 6 and 7). Thus adjacent carriers in train formation will be assured the ability to abut positively against each other at the edges of their faces which contain the cavities rather than at some other point in the thickness of the carrier bars.

The crevices 82 thus afforded between the adjacent carrier bar portions 80 further serve to prevent conveyed material from lodging between carriers in a way to interfere with tight abutting of adjacent carriers of a common train as they travel together through the work processing station.

The present improvements provide driving mechanism and retarding mechanism, the details of which are shown on an enlarged scale in Figs. 8 to 13 inclusive, and whose purpose it is to apply in opposed directions the forces which act to keep the carriers of a common train in tightly abutting contact independently of looseness in the fit of pivot pins 77 while the carriers are conveying material to or in a processing station between the driving and retarding mechanisms. These mechanisms will hereinafter be explained in fuller detail.

Upon each chain link, at the end of its supported carrier, is rigidly mounted an L-shaped block 83 in which is cut a number of preferably whole gear teeth 84 whose contours may be those of the teeth of a rack. The tooth spacing is such with reference to the adjacent edges of the L-shaped blocks that the pitch spacing between the end teeth of two adjacent blocks is equal to the pitch spacing between adjacent whole teeth on a single block. This pitch spacing is determined by the placement of the blocks 83 upon their respective chain links and by the inter-abutting of adjacent carriers, there being preferably a small space 85 between adjacent blocks about equal to the crevice 82 between the carrier portions 80 as shown in Fig. 7. This further makes possible an economical method of producing the toothed blocks 83 by cutting apart a rack in which has been milled a continuous series of ordinary gear teeth, the thickness of the cutting saw equaling the space 85.

Fig. 6 shows most plainly the manner in which the end of each carrier 78, and likewise the toothed block 83, are rigidly secured to the same chain link by similar cap screws 87 having threaded engagement with the link and having their heads sunk within counterbores in the exposed surfaces of the carrier and of the block. The carrier and/or the toothed block may thereby selectively and independently be removed from the link for replacement or repair. This construction is preferably common to all of the carriers and toothed blocks which are respectively associated with the separate chains of links. Each toothed block has relieved or cut-back corners at 88 which afford the clearance to permit angular inclination of adjacent toothed blocks relative to each other as they are carried by the chain around each of the chain supporting wheels as shown in Fig. 1.

While the working faces of the carriers may be recessed to form cavities of any desired shape, size and relationship, the cavities shown in Figs. 5, 6 and 7, comprise closely adjacent half round grooves 92 disposed end to end in adjacent carriers and parallel with the direction of travel of the train, thereby forming continuous grooves when the adjoining edges of the mold sections abut. For insuring exact lateral register of these half round grooves in the carriers of the lower train with corresponding half round grooves in the correspondingly constructed mold sections of the upper train, each carrier of the lower train, near each of its ends, is equipped with a fixed key 89 adapted to engage with a corresponding keyway 90 in the opposed surface of each mold section of the upper train. The keyway is preferably deeper than the projecting portion of the key so that a small clearance exists between the top of the key and the bottom of the keyway when these parts are fully engaged. If the two trains of mold sections are so related that the junctions between mold sections of one train are staggered with relation to the junctions between the mold sections of the other train, each key will engage with a portion of the two aligned keyways in adjacent mold sections, so that this key and keyway engagement will perform the further important function of keeping the molding grooves of adjacent mold sections in a single train in straight directional alignment with one another.

With particular reference to Figs. 1 to 4, there will now be described the support tracks which extend lengthwise of the processing station for bearing the weight of the horizontally traveling train of carriers, and also the superimposed constraining tracks of similar construction and corresponding length, which prevent the mold sections of the overhead train from being lifted away from designed closeness to the carriers of the lower train by the expansive power of such swelling vulcanizable plastics as sponge rubber composition when confined and heated within the mold chambers formed by cavities 92. Extending lengthwise of the machine and secured upon the top flange of each of channel beams 11 and 12, respectively, are running plates 93 and 94. A sectional run of trough-like structure giving bearings to a series of freely turnable track rollers, extends lengthwise of each running plate and is fixed to the top thereof and comprises a base strip 95 and upstanding side strips 97 and 98, secured to the base strip 95 by through bolts 99. In each of the side strips are seated a series of ball bearings 100 respectively supporting the rollers 102. The latter partly occupy the trough between the side strips.

The links 74 and 75 of the lower chain ride upon the track rollers 102 and the latter are preferably so spaced that at least two of them may contribute to the support of each link in the chain (see Fig. 2). This arrangement, together with flexibility in the train of carriers produced by the pivotal joint between links, relieves each pair of rollers from supporting more than half the weight of the carrier plus the weight of one link and one rack block end portion. The base strip 95, and/or side strips 97, 98, may be divided longitudinally into any suitable number of lengthwise sections such as A and B in Fig. 1, each section being separately removable to permit the servicing or renewal of certain rollers or bearings without disturbing those which do not require attention. Base strips 95 are secured to running plates 93 and 94 by bolts 96.

Extending lengthwise of the machine and secured against the bottom flange of each of channel beams 17 and 18, are Z-bars 103 to which a similar, but inverted, sectional run of trough-like structure is secured. This structure gives bearings to a series of freely turnable rollers 104 superimposed above the rollers 102 and is composed of a top strip 105 with separate side strips 106 and 107. The side strip 106 contains vertically elongated slots 108 penetrated by the bolts 109 having threaded engagement with the Z-bars 103. Sectional lengths of the top strip 105 and of the side strips 106 and 107 are rigidly but removably held together by the through bolts 110. In each of the side strips is seated a series of ball bearings 100, like those in the strips 106 and 107, respectively carrying the lift limiting rollers 104 which partly occupy the inverted trough between the side strips. The top strip 105 may be adjustably forced or held downward by the heads of vertical adjustment screws 113 which have threaded engagement with the Z-bars 103 and with the lower flange of the frame beam, being held from accidental turning by the lock nuts 114.

When there is any tendency of the links of either lower or upper chains to rise, owing to buckling action which might be occasioned by straight-a-way impelling and opposing forces applied to the train of carriers while passing through the processing station, these links of either chain will be held downward by rollers 104 at each side of the machine but these rollers will offer practically no frictional resistance opposing the designed straight line travel of any link in the chain while passing through the processing station.

The top strip 105 and/or side strips 106, 107, may be divided longitudinally into any suitable number of sections, such as C and D in Fig. 1, which will permit the servicing or renewal of certain rollers or bearings without disturbing these which do not require attention, and will further permit independent vertical adjustment of different such sections.

With particular reference to Figs. 1 and 8 to 13, inclusive, the driving and retarding mechanisms by which impelling power and opposing resistance is applied directly to the toothed blocks 83 during their travel through the processing station (considered as the portion of the machine occupied by contiguous stretches of the chains) will now be described. The spur gear 115 is fixed on a vertical shaft 117 and constantly meshes with one or another toothed block 83 carried by links 74 of the lower chain, and is rotated clockwise in Fig. 13 by power, thereby constantly acting to impel these blocks from left to right in Figs. 1 and 13 as the teeth 84 on the successive blocks come into mesh with the teeth on gear 115. The shaft 117 is given bearing in a bushing 118 in the bearing block 119 which is bolted to the outer edge of the running plate 94 and also in the bearing cap 120 which is bolted downward against the bearing block.

Power is delivered to the shaft 117 through a bevel gear 122 fixed on the bottom end of this shaft which latter is provided with a lower bearing 123 in the frame bracket 124. This bracket is constructed to also afford bearings 125 and 127, respectively, for two horizontally extending shafts 128 and 129 extending crosswise the machine as shown in Fig. 3. The horizontal shaft 129 rotates the bevel pinion 130 which meshes with the bevel gear 122 and is driven through the engagement of its carried spur gear 132 with a spur pinion 133 fixed to the horizontal shaft 128. At its opposite end, shaft 128 carries the pulley 134 which is belted to a smaller pulley 135 of the variable speed transmission unit contained within the casing 137 beneath the frame of the machine. The variable speed transmission is powered from the motor 138 by means of the belt 139, best shown in Fig. 1, which drives the constant speed pulley 140 of the transmission unit whose further details are not here shown because well understood in the art. The speed transmitted to the machine may be varied by rotatively adjusting the hand wheel 142.

The set of parts illustrated in Fig. 8, for delivering power to the train of carriers carried by the links 74 of the lower chain, is duplicated by a similar set of parts on the opposite side of the machine, as fully shown in our aforesaid copending application Serial No. 111,769, for driving the opposite ends of the carriers carried by the links 75 of the other lower chain. It will not be necessary here to repeat the description of this duplicate set of parts. Their location is represented diagrammatically in Fig. 14 by the same respective numerals, primed. In Fig. 3 it is clearly shown that a bevel gear 122' fixed to vertical shaft 117' which drives gear 115' is driven by a second bevel pinion 130' carried on the same shaft 129 with the bevel pinion 130 formerly described.

Held between the bearing block 119 and the bearing cap 120 is a short vertical shaft 143 upon which is freely turnable the spur gear 144 which is long enough to mesh simultaneously with gear teeth 84 on blocks 83 both of the lower chain and of the upper chain as best shown in Fig. 9. In this manner the power delivered to the toothed blocks of the lower chain links 74 and 75 which have passed the spur gears 115 and 115' is transmitted to the toothed blocks of the upper chain links 42 and 45 so as to force the latter constantly toward the right in Fig. 1 in unison with the toothed blocks of the lower chain links and thence on through the processing station. It will be understood that a mechanism which duplicates that of Fig. 9 is present at the location in Figs. 2 and 14 indicated by the same reference characters primed so that driving action is imparted simultaneously to each end of the mold sections as well as of the carrier sections 78, 79 at each side of the machine.

Referring particularly to Figs. 1, and 10 to 13 inclusive, a retarding mechanism is shown which, with selectively regulated force, constantly and separately acts to hold back the traveling toothed blocks of each of the upper and lower trains which are being pushed ahead, or toward the right in Fig. 1, by the driving gears 115 and 144. This retarding mechanism consists of concentrically arranged upper and lower spur gears 145 and 147, the former of which is fixed to the top of a central vertical shaft 148 and the latter of which is fixed to a hollow or tubular shaft 149 surrounding shaft 148 and independently turnable relative thereto. Hollow shaft 149 is rotatably journaled in the bearing block 150 which is bolted to the outer edge of the running plate 94 and both shafts extend downward through clearance holes in the flanges of frame beam 12 to beneath the lower flange of this beam.

Against the bottom of this flange, the two bearing plates 152 and 153 are rigidly mounted in vertically spaced relation by hollow posts 154 through which extend the bolts 155 having threaded engagement with the lower flange of the frame beam. Plate 152 provides a rigid bearing for the hollow shaft 149 and plate 153 affords a rigid bearing for the solid inner shaft 148 therebelow. A friction pulley 157 is fixed on the lower extremity of the hollow shaft 149 and is retarded in its rotative movement with a force adjustable by the friction brake band 158. In Fig. 11 this band is shown to have one end secured to a fixed anchor stud 159 and is drawn taut about the friction pulley 157 by the force of a compression spring 160 whose power may be adjusted by the nuts 162 having threaded engagement with the rod-like terminal 163 of the brake band which is guided in the rigid frame post 164. A second friction pulley 165 is fixed on the lower extremity of the solid inner shaft 148 and is retarded in its movement with an adjustable force by the brake band 167. In Fig. 12 this band is shown to have one end secured to a fixed anchor stud 168 which may be identical with stud 159 and is drawn taut about friction pulley 165 by the force of a compression spring 169 whose power may be adjusted by the nuts 170 having threaded engagement with the rod-like terminal 172 of the brake band which is guided in the rigid frame post 173.

As in the case of the spur gears 115 and 115' of the driving mechanism, all of the parts shown in Figs. 10, 11 and 12 are duplicated at the positions represented by their corresponding numerals primed in Fig. 14 on the opposite or left side of the machine for separately holding back the toothed blocks 83 which are rigid with the opposite ends of the mold sections and which it will not be necessary to describe in detail because of their similarity in construction and operation.

There is herein illustrated for delivering heat to the traveling train of carriers a series of plate sections 175 containing communicating passages for steam to provide a vulcanizing heat. These plate sections combine to extend substantially the full length of the straight-a-way span of the traveling trains of mold sections from entrance to exit of the processing stations. Steam plate sections 175 are supported by the ends of screws 180 having threaded engagement with the angle irons 182 which are rigidly held on the running plates 93, 94, by the bolts 183 screws 180 being locked in position by the nuts 184. Pull screws 185 having threaded engagement with steam plates 175 pass through clearance holes in angle irons 182 and maintain the vertical adjustment of the steam plates effected by push screws 180. As further shown in Fig. 4, a partition 186 separates the edges of the lower steam plates 175 from the lower roller trough strips 97.

To assist in preventing objectionable sag of the trains of mold sections and of the toothed blocks and chain links with which they respectively return in unison from the right or delivery end of the machine to the left or receiving end of the machine in Fig. 1, after passing around the carrier wheels, there is provided in the upper portion of the machine any desirable number of freely rotatable cross shafts 190, pivoted at each end in ball bearings mounted in caps 192 removably secured by bolts or otherwise to the outer surfaces of the upper frame beams 17 and 18. Each of shafts 190 carries two flanged wheels 193 upon whose peripheries the chain links 42 and 45 ride in freely rolling contact as they successively pass these wheels in their return travel toward the left in the uppermost stretches of the upper chains in Fig. 1. The flanges on these wheels as well as the flanges on upper carrier wheels 20, 22, 30 and 32 retain the links in accurate alignment lengthwise of the machine during their return travel to the processing station.

In the lower portion of the machine, similar shafts 194 are freely rotatable in ball bearings mounted in caps 195 removably secured by bolts or otherwise to the outer surfaces of the lower frame beams 11 and 12. Each of shafts 194 carries two grooved wheels 197 upon whose peripheries the ends of mold sections 83 of the lower train ride in freely rolling contact as they successively pass wheels 197 in their return travel toward the left with the bottom-most stretches of the lower chains in Fig. 1. The keys 89 engage with the grooves in the peripheries of wheels 197 and thus cooperate with the flanges on lower carrier wheels 48, 49, 62 and 63, to retain the trains of mold sections in accurate alignment lengthwise of the machine during their return travel to the processing station.

It should be noted that since the pulley wheels 49 and 63 are not sprocket wheels, each chain of carriers 79 is free to slip around the periphery of each such wheel at the bight of the chain and hence were it not for the support offered by rollers 197 in the idling or return reach of the chain, the very great combined weight of the carriers in said reach of the chain would be converted into a pull tending to stretch the working reach of the chain and bring cracks to play between successive work carriers between drive gear 115 and brake gear 147.

While the entire heat retaining casing 189 for the vulcanizing machine is not shown in any one figure of the drawings, it will be understood preferably to comprise a sufficient enclosure for all parts of the apparatus above the machine legs to help to sustain a zone of sufficient heat to vulcanize rubber.

The location of lower chain carrying wheels 48 and 49 well to the left of upper chain carrying wheels 20 and 22 as shown in Fig. 1, provides a constantly moving material receiving platform in that part of the lower train of carriers which extends outwardly beyond the upper train of mold sections and toward the left in Fig. 1. This slowly but continually moving platform is well adapted to receive and support the material to be conveyed into the processing station or heat zone while at the same time exposing it conveniently to inspection and adjustment by the operator, who may thus insure that the material to be processed is suitably prepared to enter the work processing station before it is conveyed thereinto and out of his control.

While no particular kind of raw or finished work or material is herein illustrated as designed to be operated upon or processed with the help of the improved conveying apparatus herein disclosed, the operation of the work carriers will be described briefly in connection with carrying out a process of molding and uniformly vulcanizing continuous and unlimited lengths of a composition containing rubber or synthetic rubber, which composition may comprise a mixture adapted to swell considerably when subjected to a vulcanizing heat, as is the case with sponge rubber compound. Such a process is referred to in the hereinbefore mentioned U. S. Patents Nos. 2,200,262 and 2,218,527. Other kinds of materials may be worked upon and many different forms of resulting product may be manufactured with the assistance of the present improvements.

In operation carriers 79 are maintained suitably warmed by heat delivered by steam plates 175 when electric motor 138 is running which drives the pulley 134 at variable speed through a transmission mechanism housed at 137. The speed of pulley 135 is determined by manual adjustment of the transmission regulating hand wheel 142. Thus power is delivered at selective speed to pulley 134, shaft 128, pinion 133, gear 132, shaft 129, and bevel pinions 130 and 130'. These parts are best shown in Figs. 1, 3 and 14. The upright shafts 117 and 117' are thereby rotated respectively clockwise and counterclockwise and at uniform speed in Fig. 14 so that spur gears 115 and 115' constantly impel toward the right in Fig. 1 the successive toothed blocks 83 on opposite ends of the carriers 79 as these toothed blocks are brought into mesh with the spur gears by the chain links 74 and 75.

As the toothed blocks 83 progress they come into mesh with gears 144 and 144' on respectively opposite sides of the machine, and which gears are also in mesh with the similar toothed blocks of an upper train of mold sections 78, the last said blocks being conveyed into mesh with gears 144 and 144' by chain links 42 and 45. Thus from the receiving or left end of the machine in Fig. 1 to the work delivering or right end of the machine in Fig. 1, all of the mold sections 78 in the upper train and carriers 79 in the lower train are constantly pushed forward in unison by power applied before entrance to the processing station. Near the exit of the processing station the movement of the toothed blocks toward the right in Fig. 1 is constantly opposed, in the case of the upper train of mold sections 78, by the retarding gears 145 and 145' whose rotation is respectively opposed by the brake band 167 and by a similar brake band (not shown) on the other side of the machine. In the case of the lower train of carriers 79, the movement of the toothed blocks toward the right is constantly opposed by the retarding gears 147 and 147' whose rotation is respectively opposed by the brake band 158 and by a similar brake band (not shown) on the other side of the machine (see Fig. 10). Thus the mold sections in both trains are kept forcefully thrust together during their travel to and in a processing station from gears 144 and 144' to gears 145, 145', 147 and 147'. In this travel also, mold sections 78 and carriers 79 may be maintained in face to face contact by the limited space between lower track rollers 102 and the upper series of constraining rollers 104. None of these rollers in any way oppose the straight line travel of these carriers in unison from left to right in Fig. 1.

The moving platform which is comprised of the carriers 79 as they constantly advance from the left extremity of the machine toward the gears 144 and 144' in Fig. 1, is adapted to receive a continuous supply of unvulcanized sponge rubber composition in the form of separate strips which may be continuously deposited in the respectively adjacent grooves 92 and thereby be conveyed into the processing station.

The accessible space on this moving material receiving platform enables unprocessed material to be introduced into the grooves or mold cavities 92 in various ways. Thus, a continuous width of composition sheet may first be fed onto this platform and severed into strips respectively occupying the adjacent grooves by causing such sheet to be progressively pinched under a preferably cooled roller whose periphery may be pressed constantly downward against the upper faces of carriers 79 as indicated in the aforesaid United States patents, or successive short lengths of unvulcanized strip may be placed in or fed into the grooves or molding cavities 92 to fill them lengthwise completely as they advance toward the processing station.

The improvements as defined in the following claims are susceptible of embodiment in mechanical parts and arrangements of parts differing greatly from the particular parts and arrangements set forth in the drawings and description hereof to illustrate the invention and consequently the language of the claims will be understood as inclusive of equivalent parts and arrangements which might be substituted for those herein chosen for seizing upon the principles of these improvements.

I claim:

1. Apparatus of the character described, embodying in combination, carriers for work to be processed linked together to form a train, powered driving means constructed and arranged to perform continuous movement in the same direction and acting thereby to push constantly on successive carriers of said train, and brake means constructed and arranged to exert a retarding force yieldingly on successive carriers of said train in a manner to oppose the travel of all carriers which have passed said driving means, thereby to cause all of the adjacent carriers between said driving means and said retarding means to be thrust tightly together as they travel in unison.

2. In combination with apparatus as described in claim 1, a series of freely turnable rollers arranged and positioned to provide anti-frictional support for the weight of the said chain links and carriers in the path of travel thereof between the said driving means and the said brake means.

3. In combination with apparatus as described in claim 1, a support frame for the apparatus, a track structure including a series of freely turnable rollers positioned to provide anti-frictional support for the weight of the said chain links and carriers in the path of travel thereof between the said driving means and the said brake means, said track structure being comprised of separable sections each of which sections is separately mounted on said frame in a manner to permit removal of a single track section without disturbance of the other track sections.

4. In combination with apparatus as described in claim 1, a series of freely turnable rollers arranged and positioned to provide anti-frictional support for the weight of the said chain links and carriers in the path of travel thereof between the said driving means and the said brake means, together with a superimposed series of freely turnable rollers arranged and positioned positively to limit with anti-frictional resistance the lifting displacement of said chain links and carriers as they travel along said path.

5. In combination, a chain comprised of pivotally coupled conveyor links, a work receiver having a recessed end detachably clamped against a portion of the top surface of each of said links, and means for impellably engaging each of said links comprising an L-shaped block detachably clamped against another portion of said surface of each of said links and carrying gear teeth projecting laterally outward beside the link.

6. Apparatus of the character described, embodying in combination, an endless chain of rigid links, a pulley operatively engaging each end bight of said chain in a manner idly to support the same without impelling said chain in its direction of travel, loosely fitted pivotal joints connecting adjacent links and providing play therebetween, a train of rigid carriers for work to be processed respectively attached to said links, driving means constructed and arranged to perform continuous movement in the same direction and acting thereby to push constantly on successive carriers of said train, and brake means constructed and arranged to exert a retarding force yieldingly on successive carriers in a manner to oppose the travel of all carriers which have passed said driving means while said carriers are being pushed in said direction by the latter.

7. In combination, a chain comprised of pivotally coupled conveyor links, a work receiver having a recessed end detachably clamped against a portion of the top surface of each of said links, and means for impellably engaging each of said links comprising a block detachably clamped against another portion of said surface of each of said links and carrying gear teeth projecting laterally outward beside the link.

8. Apparatus of the character described, embodying in combination, at least one endless chain of pivotally connected rigid links, a pulley operatively engaging each end bight of said chain in a manner idly to support the same so that said chain is free to slip around the periphery of said pulley and so that said chain is divided into a work processing reach of chain and an idling return reach of chain, a train of heavy carriers for work to be processed respectively attached to said links, driving means constructed and arranged to perform continuous movement in the same direction and acting thereby constantly to urge forward successive carriers in a work processing reach of said chain between said pulleys, brake means constructed and arranged to exert a retarding force yieldingly on successive carriers in said working reach of chain in a manner to oppose the travel of all carriers which have passed said driving means while said carriers are being pushed in said direction by the latter, support means arranged along the idling return reach of said chain between said pulleys in a manner to prevent the weight of said carriers in said return from sagging sufficiently to exert a stretching pull on said chain around said pulleys capable of separating adjacent carriers between said driving means and said brake means.

LUDOLF H. DE WYK.